United States Patent
Sun et al.

(10) Patent No.: US 7,184,280 B2
(45) Date of Patent: Feb. 27, 2007

(54) LLC SERIES RESONANT CONVERTER AND THE DRIVING METHOD FOR THE SYNCHRONOUS RECTIFICATION POWER SWITCHES THEREOF

(75) Inventors: Chaoqun Sun, Taoyuan Hsien (TW); Hongjian Gan, Taoyuan Hsien (TW); Jianping Ying, Taoyuan Hsien (TW)

(73) Assignee: DELTA Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 11/158,534

(22) Filed: Jun. 21, 2005

(65) Prior Publication Data

US 2006/0187686 A1 Aug. 24, 2006

(30) Foreign Application Priority Data

Feb. 21, 2005 (TW) ............................... 94104986 A (51) Int. Cl.
*H02M 3/315* (2006.01)
(52) U.S. Cl. .................. 363/21.02; 363/17; 363/98; 363/127
(58) Field of Classification Search ............ 363/15–17, 363/21.02, 21.06, 21.14, 98, 127
See application file for complete search history.

(56) References Cited

U.S. PATENT DOCUMENTS

| 5,805,432 A * | 9/1998 | Zaitsu et al. ............... 363/16 |
| 6,370,050 B1 * | 4/2002 | Peng et al. ............... 363/98 |
| 6,934,167 B2 * | 8/2005 | Jang et al. ............ 363/21.02 |

* cited by examiner

*Primary Examiner*—Gary L Laxton
(74) *Attorney, Agent, or Firm*—J.C. Patents (57) ABSTRACT

An LLC series resonant converter and a driving method for the synchronous rectification power switches thereof are provided. The LLC series resonant converter includes a bridge circuit, a resonant network, a transformer, a rectification circuit, and a frequency adjustment controller. The bridge circuit includes at least one pair of power switches. The power switches drive the resonant network. The rectification circuit includes at least one pair of synchronous rectification power switches. The synchronous rectification power switches and the power switches have a mapping relation between them. The frequency adjustment controller provides driving signals to the synchronous rectification power switches in response to the operating frequency of the LLC series resonant converter and the series resonant frequency of the resonant network, to implement synchronous rectification in the LLC series resonant converter.

20 Claims, 7 Drawing Sheets

LLC SERIES RESONANT CONVERTER AND THE DRIVING METHOD FOR THE SYNCHRONOUS RECTIFICATION POWER SWITCHES THEREOF

CROSS-REFERENCE TO RELATED APPLICATION

This application claims the priority benefit of Taiwan application serial no. 94104986, filed on Feb. 21, 2005. All disclosure of the Taiwan application is incorporated herein by reference.

BACKGROUND OF THE INVENTION

1. Field of Invention

The present invention relates to an LLC series resonant converter and the driving method for the synchronous rectification power switches, and particularly to an LLC series resonant converter adopting a frequency adjustment controller to provide driving signals and the driving method of the synchronous rectification power switches thereof.

2. Description of Related Art

Figure 1:
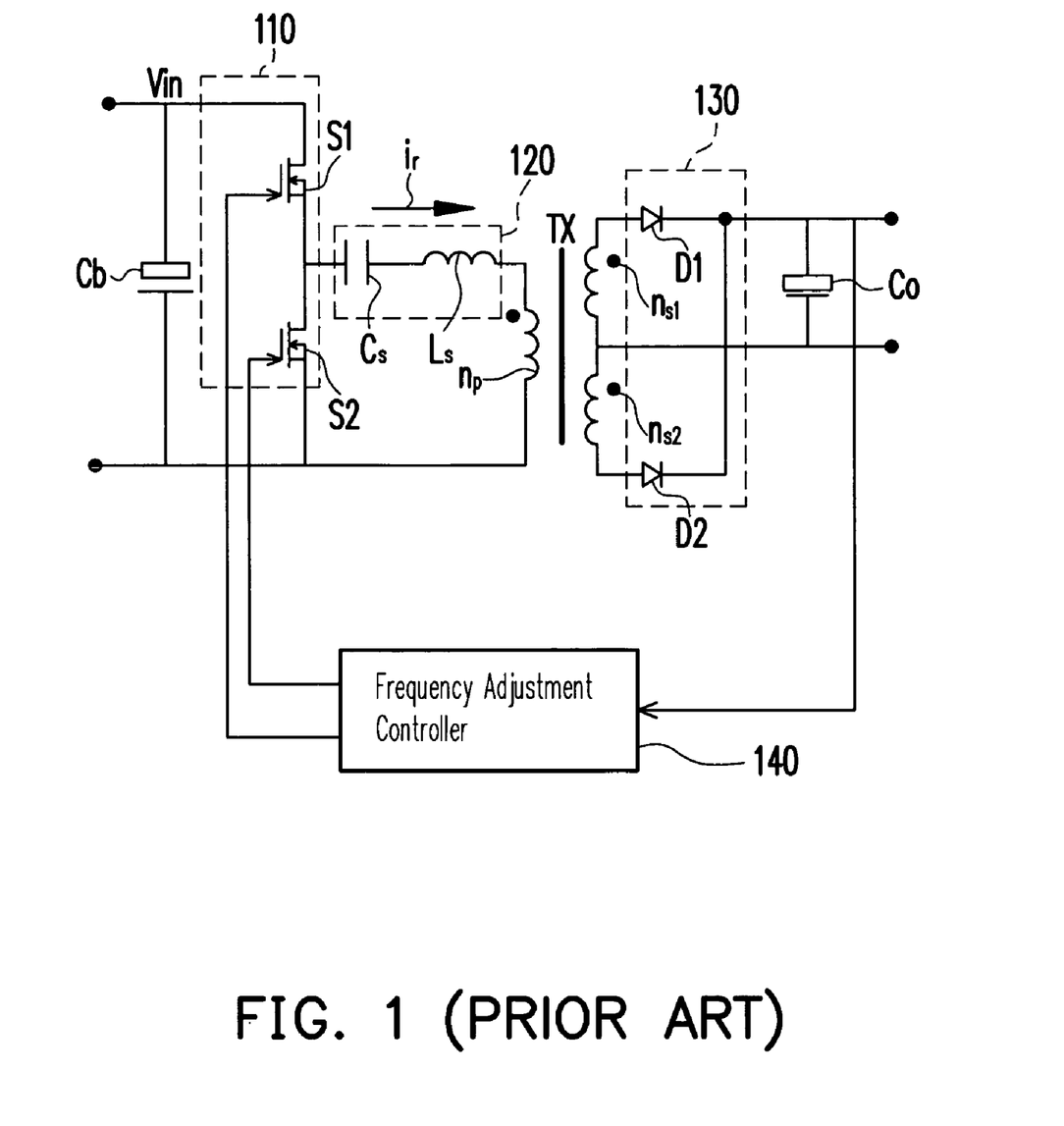
FIG. 1 is a conventional circuit configuration of a widely used LLC series resonant converter.

FIG. 1 is a prior art circuit configuration of a widely used LLC series resonant converter (SRC) having a half-bridge structure. Here, LLC represents a circuit composed by two inductors and a capacitor. It includes a half-bridge circuit (110) formed by a pair of power switches S1 and S2 for driving a resonant network (120). The resonant converter has 3 resonant parameters including a series resonant inductor Ls, a series resonant capacitor Cs and a magnetizing inductor Lm of a transformer TX (not shown in FIG. 1). The series resonant inductor Ls can also be formed by leakage inductance from the transformer TX. Such three resonant parameters determine two characteristic resonant frequencies fs and fm shown in following:

$$fs = \frac{1}{2\pi\sqrt{L_s \cdot C_s}} \quad (1)$$

$$fm = \frac{1}{2\pi\sqrt{(L_s + L_m) \cdot C_s}} \quad (2)$$

The input terminal of the LLC series resonant converter is a DC voltage Vin. The transformer TX isolates the half-bridge circuit (110) and the resonant network (120) from a rectification circuit (130) by a primary side winding $n_p$ and two series secondary sides winding $n_{s1}$ and $n_{s2}$, coupled in series.

The rectification circuit (130) includes a pair of rectification diodes D1 and D2 connected to an output capacitor Co. The cathodes of D1 and D2 are connected to the anode of capacitor Co. The anode of D1 is connected to the positive terminal of the secondary side coil ns1, whereas the anode of D2 is connected to the negative terminal of the secondary side coil ns2. A common connection node between the coils ns1 and ns2 is a ground of an output voltage Vo.

The power switches S1 and S2 of the LLC series resonant converter operate under the condition of equal pulse width, that is, in the condition of 50%. A frequency adjustment controller 140 is therefore demanded because the adjustment of the output voltage is obtained by changing the operation frequency.

LLC series resonant converter has the characteristics that proper parametric design and operating ranges can guarantee the power switches of a primary side bridge circuit to be operated under a zero voltage switching (ZVS) condition, and at the same time causing the rectification switches of a secondary side to perform as zero current switching (ZCS).

Figure 2:
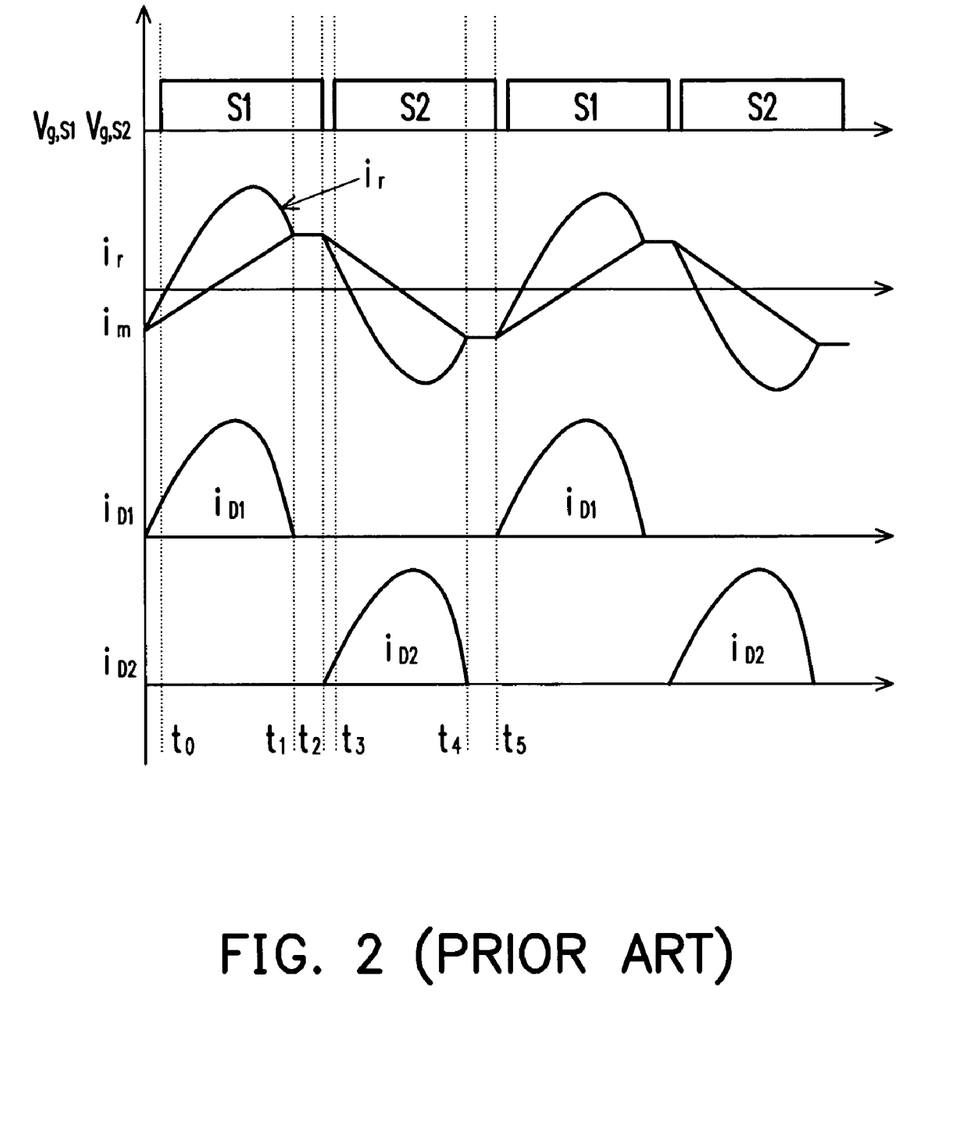
FIG. 2 is a schematic diagram of the operating situation sequence of the conventional LLC series resonant converter.

FIG. 2 is a schematic diagram of the operating situation time sequence of the LLC series resonant converter shown in FIG. 1, when the operating frequency f of power switches S1 and S2 satisfies the formula of $$fm \leq f \leq fs \quad (3),$$

wherein $V_{g,S1}$ and $V_{g,S2}$ respectively refer to the driving signals for the power switches S1 and S2.

At time of t0, because the primary side current $i_r$ is opposite to a reference direction, the power switch S1 opens under the ZVS condition. During the interval between t0 and t1, the rectification diode D1 is conducted with current, therefore the voltage on the magnetizing inductor Lm is constant and does not take part in the resonance, so that the magnetizing current $i_m$ increases linearly. Referring to FIG. 2, due to the resonance between Ls and Cs, current $i_{D1}$ through D1 appears in a quasi-sine waveform.

At time of t1, because the switching period is longer than the resonant period between Ls and Cs, $i_r$ descends down to $i_m$ before the shutting off of S1, so D1 is off at this moment. Cs, Ls and Lm take part in the resonance. For the purpose of simplifying analysis, supposed to be the condition of Lm>>Ls, then the $i_r$ is approximately a straight line.

At time of t2, S1 is turned off and S2 is conducted. At time of t3, S2 is switched on under ZVS condition.

During the intervals from t3 to t4 and from t4 to t5, similar process can be analyzed out. The operation status and current waveform $i_{D2}$ similar to D1 also happen to the rectification diode D2. $i_{D1}$ and $i_{D2}$ compose the output rectification current $i_{rec}$.

If the LLC series resonant converter operates at switch frequency fs, the dead time of output rectification current $i_{rec}$, in which both rectification diodes D1 and D2 are non-conducting during the dead time, disappears and rectification current $i_{rec}$ has a quasi-sine absolute value waveform.

In order to operate in a wide range of input voltage and output load, the LLC series resonant converter in practical operation is usually operating under the condition that the dead time the $i_{rec}$ is zero. As, at this time, the shutting off action of the rectification diode D1 or D2 always happens before the power switches S1 or S2 are off, the conducting pulse widths of D1 and D2 are smaller than those of S1 and S2. Nowadays, it becomes popular to adopt a power metal oxide semiconductor field effect transistor (MOSFET) to substitute rectification diodes D1 and D2 operating as synchronous rectification power switches. In this manner, the driving pulse of the synchronous rectification power switches has to be off when the backward current flowing from the source to the drain descends down to zero, that is, non-conducting state during the dead time of the $i_{rec}$. Otherwise, the output terminal of the converter would transport power to the primary side of the converter, and the circuit would not be able to operate properly and safely. Accordingly, the driving signals of power switches S1 and S2 cannot be used to obtain the driving signals for synchronous rectifiers.

Moreover, the coil of the transformer TX could be used to obtain the driving signals for the synchronous rectifier power switches, since during the dead time of $i_{rec}$, the voltage of secondary side coil is not zero, but is the resonant voltage on Lm.

Therefore, better technique is demanded to solve the above problems to provide proper driving signals, so that the power MOSFET can replace the rectification diodes and the synchronous rectification in the LLC series resonant converter can be implemented, and it can guarantees the safe and reliable operation under any operation condition.

SUMMARY OF THE INVENTION

It is an object of the present invention to provide an LLC series resonant converter, and a driving method for the synchronous rectification power switches to obtain suitable driving signals, which allow the power MOSFETs to substitute the rectification diodes, therefore synchronous rectification in the LLC series resonant converter can be implemented, and operation under any conditions can be guaranteed in safe and reliability.

For achieving the foregoing object and others, the present invention provides an LLC series resonant converter, which includes a bridge circuit, coupling to an input voltage, and including at least one pair of power switches; a resonant network, coupling to the bridge circuit, being driven by the power switches; a transformer, coupling to the resonant network; a rectification circuit, coupling to the transformer, the transformer providing output current of the LLC series resonant converter. The rectification circuit includes at least one pair of synchronous rectification switches. The synchronous rectification power switches and the power switches have a mapping relation between them. The synchronous rectification switch and its corresponding power switch are synchronously on or off. A frequency adjustment controller is coupled between the power switches and the synchronous rectification power switches, supplying driving signals for the synchronous rectification power switches, and thereby implementing synchronous rectification in the LLC series resonant converter. When the operating frequency of the LLC series resonant converter is less than the series resonant frequency of the resonant network, the driving signals of each of the synchronous rectification switches are constant width pulse signals which are synchronous with their corresponding power switch's signals. The width of the constant width pulse signals is determined by the series resonant parameter of the resonant network. When the operating frequency of the present invented LLC series resonant converter is higher than or equal to the series resonant frequency of the resonant network, the driving signals of each of synchronous rectification power switches are the driving signals of the corresponding power switches.

From another aspect, the present invention is to provide a driving method for the synchronous rectification power switches, which is used in an LLC series resonant converter. The LLC series resonant converter includes a bridge circuit, a resonant network, and a rectification circuit, wherein the bridge circuit includes at least one pair of power switches. The rectification circuit includes at least one pair of synchronous rectification power switches. One of synchronous rectification power switches Q1 and Q2 and one of the power switches S1 and S2 are correspondingly and electrically coupled through one of a pair of driving signal generators. The corresponding synchronous rectification power switches and the power switches are synchronously on or off. The driving method for the synchronous rectification power switches includes the steps of: obtaining the operating frequency of the LLC series resonant converter; obtaining the series resonant frequency of the resonant network; and when the operating frequency of the LLC series resonant converter is lower than the series resonant frequency of the resonant network, the driving signals of each of the synchronous rectification switches being constant width pulse signals which are synchronous with their corresponding power switch's signals. The width of the constant width pulse signals is determined by the series resonant parameter of the resonant network. Also and, when the operating frequency of the LLC series resonant converter is higher than or equal to the series resonant frequency of the resonant network, the driving signals of each of the synchronous rectification power switches are the driving signals of the corresponding power switches.

The present invention is based on the relation in quantity between the operating frequency of the LLC series resonant converter and the series resonant frequency of the resonant network, and based on the diving signals of the power switches, so as to provide the driving signals of the synchronous rectification power switches. As a result, the power MOSFET can replace the rectification diodes and implement the synchronous rectification in the LLC series resonant converter, and further assure the safe and reliable operation in any operation condition.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

A following preferred embodiment is taken to describe the LLC series resonant converter (SRC).

According to the operating waveform of the LLC series resonant converter, as shown in FIG. 2, when the output rectification current $i_{rec}$ has a dead time, the conducting time of the rectification diodes D1 and D2 is a half time period $1/(2fs)$ of the LLC series resonant converter, but it is determined by the values of Ls and Cs. When a range of the input voltage or the output voltage changes, provided fm<f<fs, the conducting time of each of the rectification diodes D1 and D2 does not change thereafter. The change is just the dead time of the rectification current $i_{rec}$, which is the time interval from t1 to t2 or from t4 to t5. When the operating frequency is higher than fs, the output rectification current $i_{rec}$ does not have a dead time. Therefore, the conducting times of D1 and D2 are respectively corresponding to the conducting times of the power switches S1 and S2.

In view of the above, the preferred embodiment adopts a self-adaptive synchronous rectification driving method for the LLC series resonant converter, wherein the pulse width of the driving signals can be automatically adjusted according to the operating frequency of the LLC series resonant converter. When the operating frequency is between fm and fs, the synchronous rectification driving signals have a constant pulse width. When the frequency of the LLC series resonant converter is adjusted due to the change of the input voltage or the output load, the synchronous rectification driving signals therefore synchronously change their frequencies, while the pulse width does not change. When the operating frequency is higher or equal to fs, the synchronous rectification driving signals is determined by the driving signals of the power switches S1 and S2, being in-phase and having the same pulse width. Consequently, the pulse width of the synchronous rectification switches changes according to the operating frequency.

Figure 3:
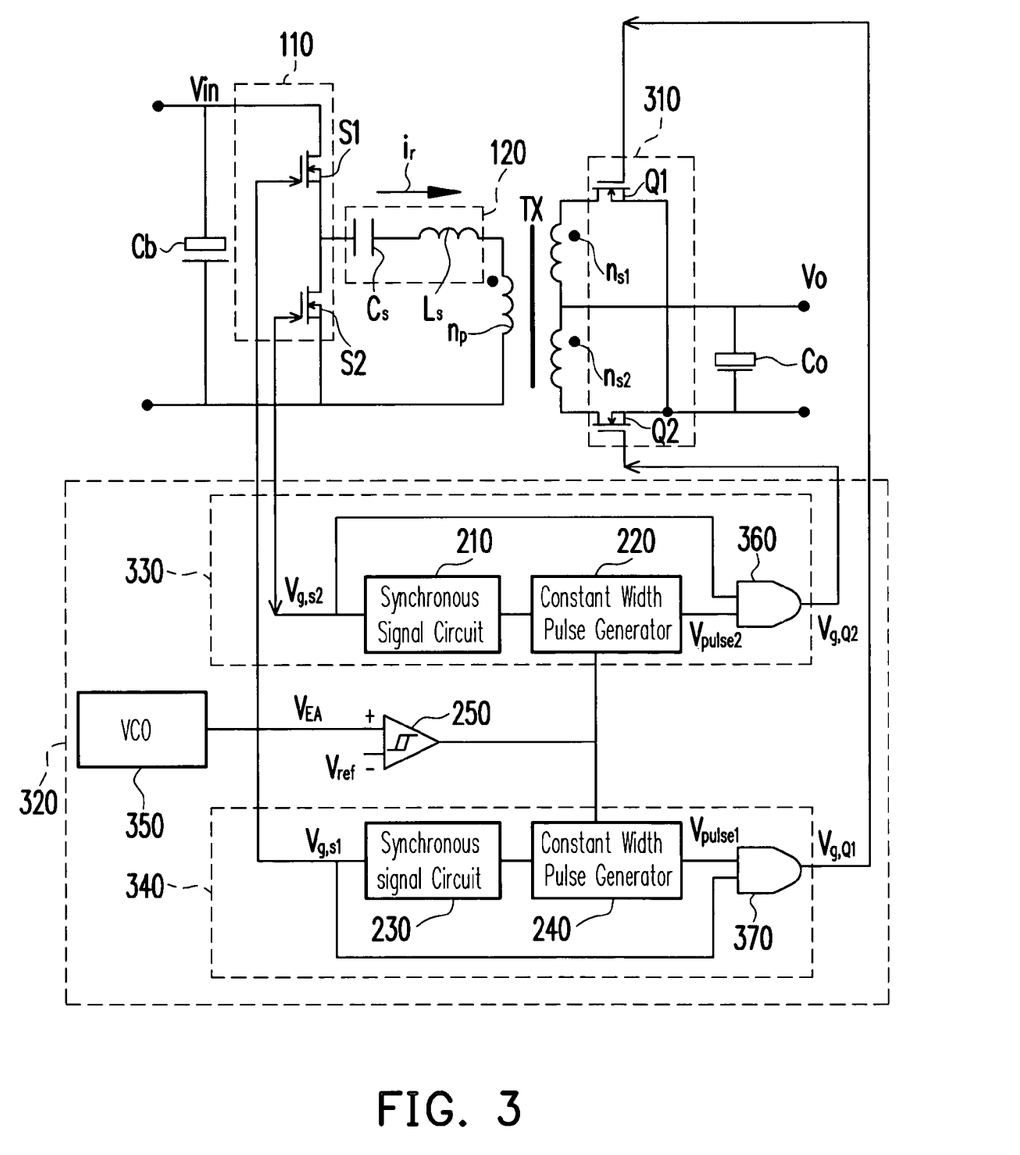
FIG. 3 is a circuit configuration of an LLC series resonant converter, according to a preferred embodiment of the present invention.

FIG. 3 schematically illuminates the operation mechanism of a preferred embodiment of the present invention for the LLC series resonant converter. The devices therein includes a half-bridge circuit 110 coupled to an input voltage $V_{in}$, a resonant network 120 driven by the power switches S1 and S2, a transformer TX, a rectification circuit 310 for providing current from the transformer TX, and a frequency adjustment controller 320. The preferred embodiment of the present invention is different from the conventional circuit shown in FIG. 1 by rectification circuit 310 for replacing the conventional rectification circuit 130, wherein the synchronous rectification power switches Q1 and Q2 has replaced the conventional rectification diodes D1 and D2. Also and, a preferred frequency adjustment controller 320 has replaced the conventional frequency adjustment controller 140. The frequency adjustment controller 320 includes one pair of driving signal generators 330 and 340, a locking circuit 250 and a voltage control oscillator (VCO) 350. The driving signal generators 330 further includes a synchronous signal circuit 210, a constant width pulse generator 220 and an AND logic gate 360. The driving signals generator 340 further includes a synchronous signal circuit 230, a constant width pulse generator 240 and an AND logic gate 370. The relation between the devices will be described later. As can be seen in FIG. 3, one of synchronous rectification power switches Q1 and Q2 and one of the power switches S1 and S2 are correspondingly and electrically coupled through one of the pair of driving signal generators 330 and 340.

For easy descriptions, a common source connecting manner for the synchronous rectification switches Q1 and Q2 is taken, but it is not the only choice in actual application.

As shown in FIG. 3, after the driving signals $V_{g,S1}$ and $V_{g,S2}$ of the power switches S1 and S2 are respectively processed by the synchronous signal circuits 210 and 230, the synchronous signals synchronizing with the driving signals $V_{g,S1}$ and $V_{g,S2}$ are generated, and then the rising edges of the synchronous signals respectively trigger the constant width pulse generators 220 and 240. As a result, the constant width pulse generators 220 and 240 export two constant width pulse signals $V_{pulse1}$ and $V_{pulse2}$ which are respectively synchronous to the rising edges of the signals $V_{g,S1}$ and $V_{g,S2}$. The pulse width is preferably set as a half period $1/(2fs)$ or slightly smaller where fs is the series resonant frequency of the resonant network 120. After the constant width pulses $V_{pulse1}$ and $V_{pulse2}$ have been respectively logically operated with the signals $V_{g,S1}$ and $V_{g,S2}$ by the AND logic gates 360 and 370, the output signals of $V_{g,Q1}$ and $V_{g,Q2}$ can be used for providing the driving signals to the synchronous rectification power switches Q1 and Q2.

Figure 4:
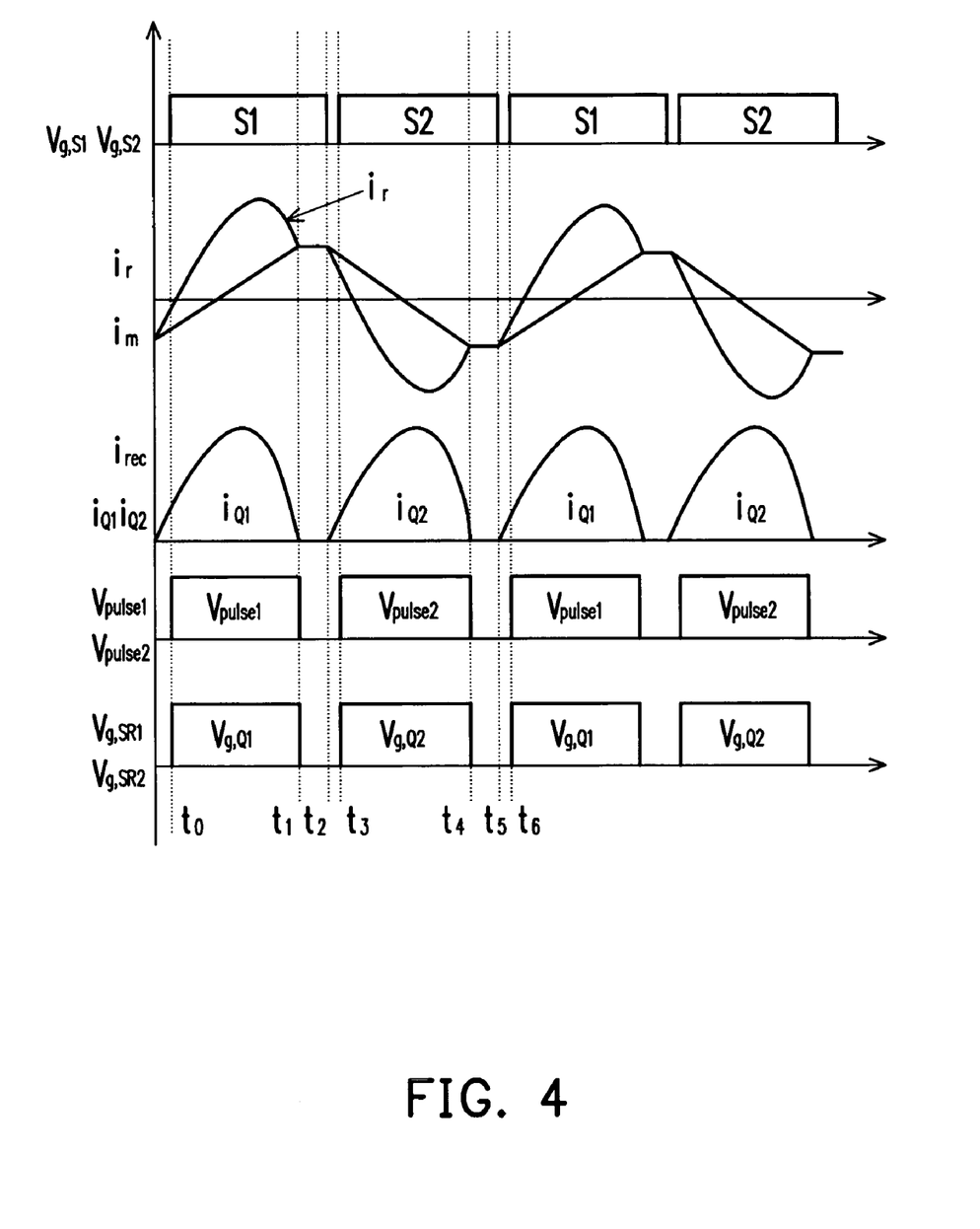
FIG. 4 and FIG. 5 are timing sequence, schematically illustrating the timing of the main signals in operating the LLC series resonant converter, according to a preferred embodiment of the present invention.

FIG. 4 is a timing sequence diagram of synchronous rectification driving for the LLC series resonant converter, when the operating frequency is between fm and fs, according to the embodiment of the present invention. In this situation, since the width of $V_{pulse1}$ and $V_{pulse2}$ is smaller than that of $V_{g,S1}$ and $V_{g,S2}$, after AND logic operation, the output is determined by $V_{pulse1}$ and $V_{pulse2}$ as two constant width pulse driving signals $V_{g,Q1}$ and $V_{g,Q2}$.

Figure 5:
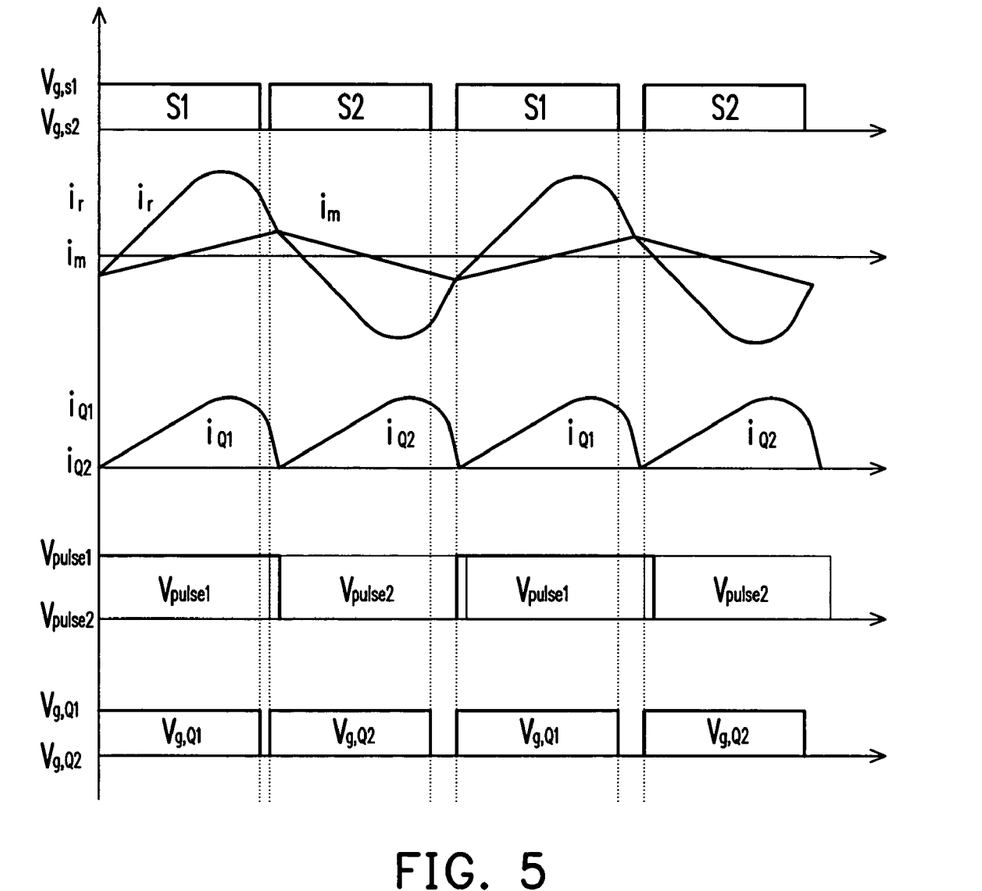

FIG. 5 is a timing sequence diagram of synchronous rectification driving for the LLC series resonant converter, when the operating frequency is higher than fs, according to the embodiment of the present invention. In this situation, since the width of $V_{pulse1}$ and $V_{pulse2}$ is larger than that of $V_{g,S1}$ and $V_{g,S2}$, after a AND logic operation, the output results of $V_{g,Q1}$ and $V_{g,Q2}$ are consistent with $V_{pulse1}$ and $V_{pulse2}$, and the pulse width changes, according to the changes of $V_{g,S1}$ and $V_{g,S2}$.

For the purpose of preventing the synchronous rectification switches Q1 and Q2 from being difficultly driven in operating at an over-high frequency, usually, when the LLC series resonant converter soft starts or operates in unloaded status under no load condition, the locking circuit 250 would judge according to the operating frequency control signals $V_{EA}$. Then a locking signal is issued to lock the output from the constant width pulse generators 220 and 240 $V_{g,Q1}$ and $V_{g,Q2}$, which are thereby locked under the foregoing condition, so that the synchronous rectification switches Q1 and Q2 are at the off state. The operating frequency control signals $V_{EA}$ can be the output of the voltage control oscillator 350 in the frequency adjustment controller 320, or any other signals capable of indicating the operating frequency.

Although two AND logic gates 360 and 370 are used to implement the self-adaptive control of the synchronous rectification driving signals, the actual circuit implementation is not limited to this logic gate structure. Any circuits that substantially behave the similar function of AND logic gate are covered within the scope of the present invention.

Figure 6:
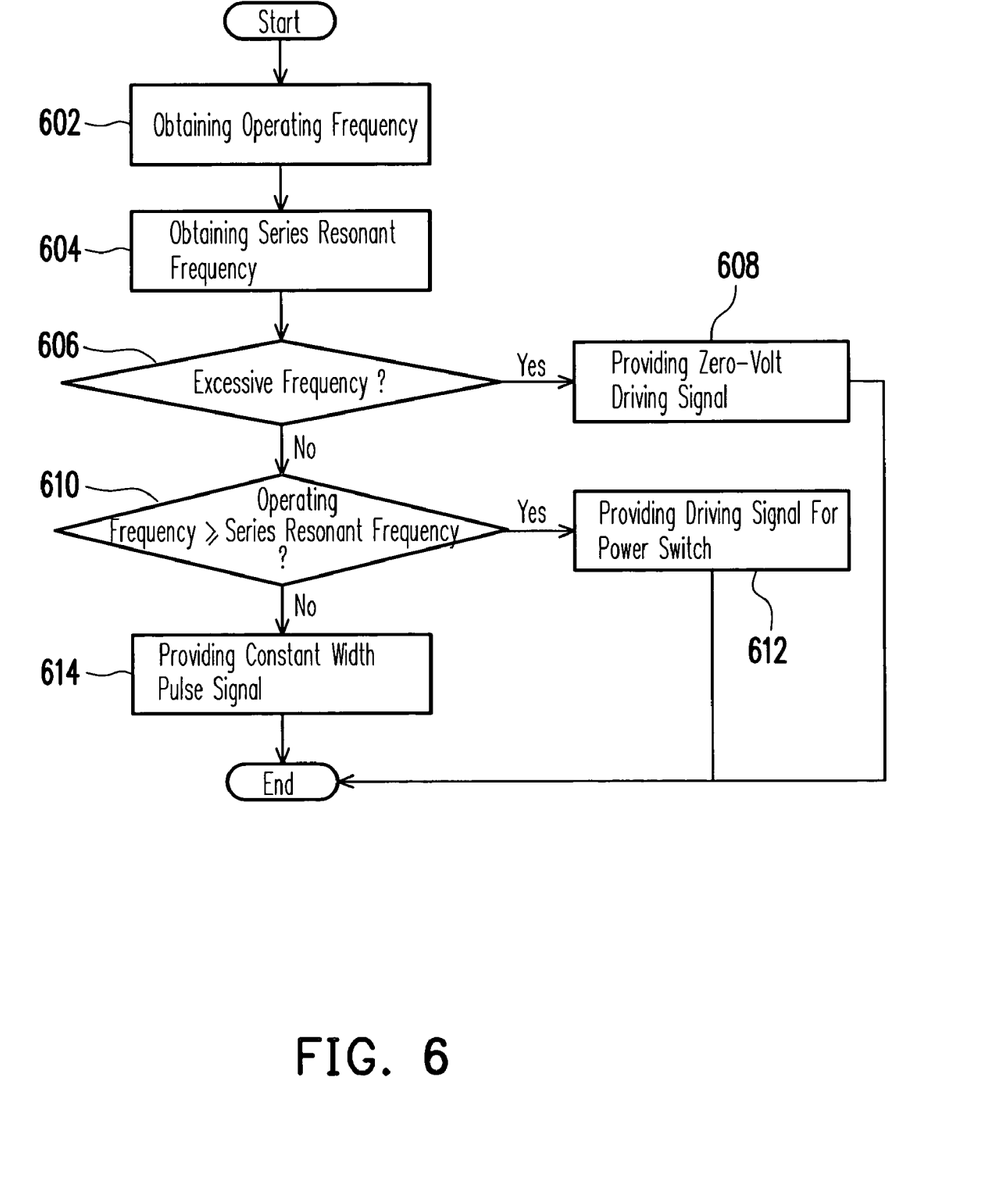
FIG. 6 is a flowchart, schematically illustrating the driving method for the synchronous rectification power switches, according to a preferred embodiment of the present invention.

According to FIG. 6, a second preferred embodiment is given to depict the driving method of the synchronous rectification power switches for the LLC series resonant converter of the present invention. The second preferred embodiment about the driving method is supposed to be used in the LLC series resonant converter of the above disclosed preferred embodiment.

First, a signal of the operating frequency of the LLC series resonant converter is obtained in step 602, and a signal of series resonant frequency of the resonant network is obtained in step 604. Then, in step 606, it is judged whether or not the operating frequency of the LLC series resonant converter is excessive, causing difficulty in driving the synchronous rectification switches. If it is, then, in step 608, a zero-voltage driving signal is provided to the synchronous rectification power switches to keep the synchronous rectification power switches in off state. This is to protect the synchronous rectification power switches from damage.

If the operating frequency is not excessive in step 606, in the following step 610, it is judged whether or not the operating frequency of the LLC series resonant converter is higher or equal to the series resonant frequency of the resonant network. If it is, in step 612, the driving signals corresponding to the power switches are provided to serve as the driving signal for the synchronous rectification power switches. Otherwise, in step 614, the constant width signals, which are synchronous with the driving signals of the corresponding power switches and have width determined by the resonant parameter of the resonant network, are provided to serve as the driving signals of the synchronous rectification power switches.

Figure 7:
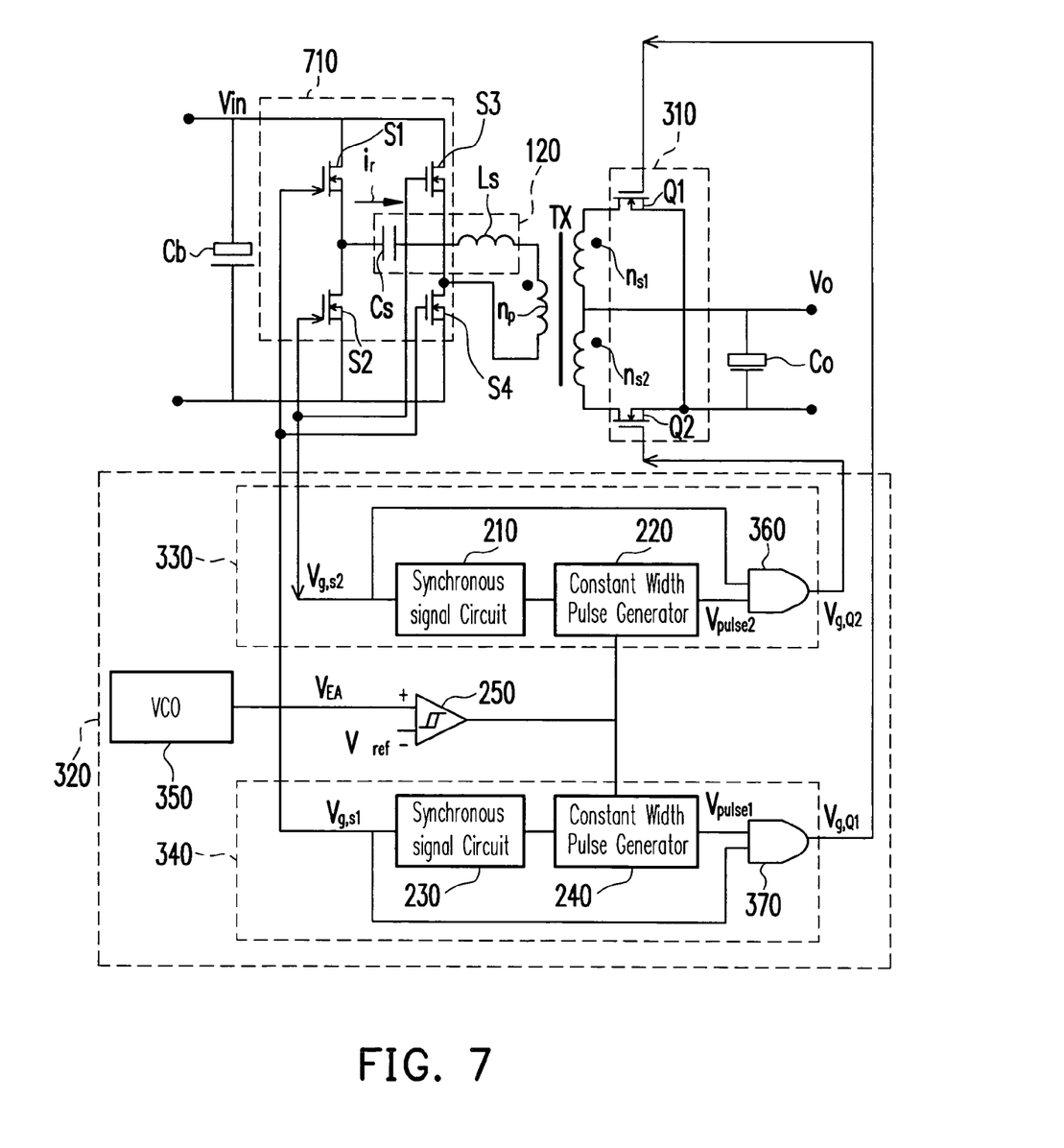
FIG. 7 is a circuit configuration, schematically illustrating another LLC series resonant converter, according to another preferred embodiment of the present invention.

FIG. 7 depicts a third preferred embodiment of the present invention, showing a circuit configuration of the LLC series resonant converter. The main difference between FIG. 7 and FIG. 3 is substituting the half-bridge circuit 110 in FIG. 3 with a full bridge circuit 710 in FIG. 7. The full bridge circuit 710 includes four power switches marked as S1 to S4, wherein S1 and S4 have the same driving signals, and S2 and S3 have the same driving signals. The operation and connection relation of the other parts in FIG. 7 are substantially the same as the corresponding part in FIG. 3.

In addition, although the rectification 310 is preferred in the above described preferred embodiment as shown in FIG. 7, the rectification circuits can also include more pair of the synchronous rectification power switches. The persons skilled in the related ordinary art can easily know the extension in the foregoing embodiment about the driving relation between the power switches for the half-bridge circuit or the full-bridge circuit, and the synchronous rectification power switches of the rectification circuit.

As illustrated above, the present invention is based on the quantities of the operating frequency for the LLC series resonant converter and the series resonant frequency for the resonant network as well as the driving signals for the power switches, so as to provide the driving signals for the synchronous rectification power switches. Therefore, the power MOSFET is allowed to replace the conventional rectification diodes, and the synchronous rectification in the LLC series resonant converter can be implemented, and the operation can be assured in safe and reliability at any operating condition.

Other modifications and adaptations of the above-described preferred embodiments of the present invention may be made to meet particular requirements. This disclosure is intended to exemplify the invention without limiting its scope. All modifications that incorporate the invention disclosed in the preferred embodiment are to be construed as coming within the scope of the appended claims or the range of equivalents to which the claims are entitled.

The invention claimed is:

1. An LLC series resonant converter, comprising:
a bridge circuit, coupled to an input voltage, comprising at least one pair of power switches;
a resonant network, coupled to the bridge circuit and being driven by the at least one pair of power switches;
a transformer, coupled to the resonant network;
a rectification circuit, coupled to the transformer, the transformer providing an output current of the LLC series resonant converter, wherein the rectification circuit comprises at least one pair of synchronous rectification power switches, one of the at last one pair of synchronous rectification power switches and one of the at least one pair of the power switches are correspondingly and electrically coupled, corresponding one of the at least one pair of synchronous rectification power switches and corresponding one of the at least one pair of power switches are synchronously on or off; and
a frequency adjustment controller, coupled between the at least one pair of power switches and the at least one pair of synchronous rectification power switches, providing driving signals to the at least one pair of synchronous rectification power switches in response to an operating frequency of the LLC series resonant converter and a series resonant frequency of the resonant network, to perform synchronous rectification in the LLC series resonant converter.

2. The LLC series resonant converter according to claim 1, wherein the frequency adjustment controller provides the driving signals for the at least one pair of synchronous rectification power switches, according to a quantity relation of the operating frequency of the LLC series resonant converter and the series resonant frequency of the resonant network.

3. The LLC series resonant converter according to claim 2, wherein the frequency adjustment controller provides the driving signals for the at least one pair of synchronous rectification power switches, according to the driving signals for the at least one pair of power switches.

4. The LLC series resonant converter according to claim 3, wherein when the operating frequency of the present invented LLC series resonant converter is lower than the series resonant frequency of the resonant network, the driving signal of each of the at least one pair of synchronous rectification power switches is a constant width pulse signal which is synchronous with the driving signal of the corresponding one of the at least one pair of power switches, the width of the constant width pulse signal is determined by a series resonant parameter of the resonant network; and when the operating frequency of the LLC series resonant converter is higher than or equal to the series resonant frequency of the resonant network, the driving signal of each of the at least one pair of synchronous rectification power switches is the driving signal of the corresponding one of the at least one pair of power switch.

5. The LLC series resonant converter according to claim 4, wherein the width of the constant width pulse signal is equal to or slightly less than a half of a series resonant period of the resonant network.

6. The LLC series resonant converter according to claim 4, wherein the frequency adjustment controller further comprises:
a pair of driving signal generators, respectively coupled between the at least one pair of power switches and the at least one pair of synchronous rectification power switches, receiving the driving signals of the corresponding one of the at least one pair of power switches, and outputting the driving signals of the corresponding one of the at least one pair of synchronous rectification power switches.

7. The LLC series resonant converter according to claim 6, wherein each of the driving signal generators comprises:
a synchronous signal circuit, coupled to the corresponding one of the at least one pair of power switches, receiving the common driving signals for one of the at least one pair of the power switches, outputting a synchronous signal synchronizing to the driving signals for the at least one pair of power switches;
a constant width pulse generator, coupled to the synchronous signal circuit, receiving the synchronous signal, outputting the constant width signal synchronizing to the driving signals for the at least one pair of power switches; and
an AND logic gate, coupled to the corresponding one of the at least one pair of power switches, the constant width pulse generator and the corresponding one of the at least one pair of synchronous rectification power switches, receiving the driving signals for the at least one pair of power switches and the constant width signals, after applying an AND logic operation on the driving signals for the at least one pair of power switches with the constant width pulse signal, thereby generating and outputting the driving signals for the at least one pair of synchronous rectification power switches.

8. The LLC series resonant converter according to claim 7, wherein a rising edge of the synchronous signals is used to trigger the constant width pulse generator and the rising edge of said the constant width pulse signal is synchronizing with the rising edge of the driving signals of said the corresponding one of the at least one pair of power switches.

9. The LLC series resonant converter according to claim 7, wherein the frequency adjustment controller further comprises:
   a locking circuit, coupled to the constant width pulse generators of the driving signal generators, outputting a locking signal with low voltage level to the constant width pulse generators when the operating frequency of the LLC series resonant converter is over high, causing a difficulty for driving the synchronous rectification switches, to lock the driving signals for the at least one pair of synchronous rectification power switches, therefore setting the at least one pair of synchronous rectification power switches to be off state.

10. The LLC series resonant converter according to claim 9, wherein the locking circuit uses an operating frequency checking signal to read the operating frequency of the LLC series resonant converter.

11. The LLC series resonant converter according to claim 10, wherein the operating frequency checking signal is generated by a voltage control oscillator.

12. The LLC series resonant converter according to claim 1, wherein the bridge circuit is a full-bridge circuit or a half-bridge circuit.

13. The LLC series resonant converter according to claim 1, wherein the resonant network includes a series resonant capacitor and a series resonant inductor in series connection.

14. A driving method for synchronous rectification power switches, applying for an LLC series resonant converter, the LLC series resonant converter comprising a bridge circuit, a resonant network and a rectification circuit, wherein the bridge circuit comprises at least one pair of power switches, the rectification circuit comprises at least one pair of synchronous rectification power switches, one of the at least one pair of synchronous rectification power switches and one of the at least one pair of the power switches are correspondingly and electrically coupled, corresponding one of the at least one pair of synchronous rectification power switches and corresponding one of the at least one pair of power switches are synchronously on or off, the driving method for the at least one pair of synchronous rectification power switches comprising the steps of:
   (a) obtaining an operating frequency of the LLC resonant converter;
   (b) obtaining a series resonant frequency of the resonant network; and,
   (c) providing driving signals to the at least one pair of synchronous rectification power switches, according to the operating frequency of the LLC series resonant converter and the series resonant frequency of the resonant network, to implementing synchronous rectification in the LLC series resonant converter.

15. The driving method for synchronous rectification power switches according to claim 14, wherein the step (c) further comprises a step of:
   providing the driving signal of the at least one pair of synchronous rectification power switches, according to a quantity relation between the operating frequency of the LLC series resonant converter and the series resonant frequency of the resonant network.

16. The driving method for synchronous rectification power switches according to claim 15, wherein the step (c) further comprises:
   providing said the driving signals of the at least one pair of synchronous rectification power switches, according to the driving signals for the at least one pair of power switches.

17. The driving method for synchronous rectification power switches according to claim 16, wherein the step (c) further comprises:
   when the operating frequency of the LLC series resonant converter is lower than the series resonant frequency of the resonant network, the driving signals of each of the at least one pair of synchronous rectification switches is a constant width pulse signal, synchronizing with the driving signals of the corresponding one of at last one pair of the power switches, and the width of the constant width pulse signal is determined by a series resonant parameter of the resonant network; and when the operating frequency of the LLC series resonant converter is higher than or equal to the series resonant frequency of the resonant network, the driving signal of each of the at least one pair of synchronous rectification power switches is the driving signals for one the at least one pair of power switches.

18. The driving method for synchronous rectification power switches according to claim 17, wherein the width of the constant width pulse signal is equal to or slightly less than a half of a series resonant period of the resonant network.

19. The driving method for synchronous rectification power switches according to claim 17, wherein a rising edge of the constant width pulse signal is synchronizing with a rising edge of the driving signals of the corresponding one of at least one pair of power switches.

20. The driving method for synchronous rectification power switches according to claim 14, further comprising:
   when the operating frequency of the LLC series resonant converter is over high, causing difficulty for driving the synchronous rectification switches, locking the driving signals for the at least one pair of synchronous rectification power switches, so that the at least one pair of synchronous rectification power switches are off state.

* * * * *